(12) United States Patent
Günster et al.

(10) Patent No.: US 10,576,656 B2
(45) Date of Patent: Mar. 3, 2020

(54) ASSEMBLY AND USE OF A GEOMETRICALLY COMPACT POWDER LAYER

(71) Applicant: BUNDESREPUBLIK DEUTSCHLAND, VERTRETEN DURCH DEN BUNDESMINISTER FÜR WIRTSCHAFT UND ENERGIE, DIESER VERTRETEN DURCH DEN PRÄSIDENTEN DER BUNDESANSTALT FÜR MATERIALFORSCHUNG UND—PRÜFUNG (BAM), Berlin (DE)

(72) Inventors: Jens Günster, Berlin (DE); Andrea Zocca, Berlin (DE); Cynthia Wirth, Berlin (DE); Thomas Mühler, Clausthal-Zellerfeld (DE)

(73) Assignee: Bundesrepublik Deutschland, vertreten durch den Bundesminister fuer Wirtschaft und Energie, dieser vertreten durch den Praesidenten der Bundesanstalt fuer Materialforschung und—pruefung (BAM), Berlin (DE)

( * ) Notice: Subject to any disclaimer, the term of this patent is extended or adjusted under 35 U.S.C. 154(b) by 440 days.

(21) Appl. No.: 15/324,438

(22) PCT Filed: Jul. 10, 2015

(86) PCT No.: PCT/EP2015/065888
§ 371 (c)(1),
(2) Date: Jan. 6, 2017

(87) PCT Pub. No.: WO2016/005588
PCT Pub. Date: Jan. 14, 2016

(65) Prior Publication Data
US 2017/0165866 A1 Jun. 15, 2017

(30) Foreign Application Priority Data

Jul. 10, 2014 (DE) ........................ 10 2014 109 706

(51) Int. Cl.
| | | |
|---|---|---|
| B28B 1/00 | (2006.01) |
| B33Y 10/00 | (2015.01) |
| B29C 64/223 | (2017.01) |
| B29C 64/153 | (2017.01) |
| B29C 64/165 | (2017.01) |
| B29C 64/205 | (2017.01) |
| B33Y 70/00 | (2020.01) |
| B28B 11/24 | (2006.01) |
| B28B 13/02 | (2006.01) |
| B28B 13/04 | (2006.01) |

(52) U.S. Cl.
CPC .............. *B28B 1/001* (2013.01); *B28B 1/008* (2013.01); *B28B 11/24* (2013.01); *B28B 13/021* (2013.01); *B28B 13/0295* (2013.01); *B28B 13/04* (2013.01); *B29C 64/153* (2017.08); *B29C 64/165* (2017.08); *B29C 64/205* (2017.08); *B29C 64/223* (2017.08); *B33Y 10/00* (2014.12); *B33Y 70/00* (2014.12)

(58) Field of Classification Search
None
See application file for complete search history.

(56) References Cited

U.S. PATENT DOCUMENTS

| | | | | |
|---|---|---|---|---|
| 4,863,538 | A * | 9/1989 | Deckard | ................ B33Y 10/00 264/497 |
| 5,204,055 | A * | 4/1993 | Sachs | ..................... B05C 19/04 419/2 |
| 6,217,816 | B1 | 4/2001 | Tang | |
| 9,981,426 | B2 * | 5/2018 | Gunther | .................. B22F 3/008 |
| 2002/0079601 | A1 | 6/2002 | Russell et al. | |
| 2015/0246485 | A1 * | 9/2015 | Guenster | ............... B22F 3/1055 264/511 |

FOREIGN PATENT DOCUMENTS

WO 2014049159 4/2014

* cited by examiner

*Primary Examiner* — Mary Lynn F Theisen
(74) *Attorney, Agent, or Firm* — Dicke, Billig & Czaja, PLLC

(57) ABSTRACT

The invention relates to an additive production method involving the production of a layer of geometrically compact particles, having the following steps: a) providing a particle layer depositing arrangement, comprising a first and a second semi-chamber, wherein a partition separates the first semi-chamber from the second semi-chamber, and the partition is permeable for a dispersion medium and impermeable for particles dispersed in the dispersion medium; b) providing a particle dispersion comprising the dispersion medium and particles dispersed therein in the first semi-chamber, the particle dispersion being distributed substantially homogenously in the first semi-chamber; c) generating a pressure gradient between the first and the second semi-chamber such that the pressure gradient in the first semi-chamber causes a particle dispersion flow directed towards the partition; and d) depositing a particle aggregate material comprising geometrically compact particles on the partition by transporting a dispersion agent into the second semi-chamber.

10 Claims, No Drawings

ASSEMBLY AND USE OF A GEOMETRICALLY COMPACT POWDER LAYER

CROSS-REFERENCE TO RELATED APPLICATIONS

This Utility Patent Application claims priority under 35 U.S.C. § 371 to International Application Serial No. PCT/EP2015/065888, filed Jul. 10, 2015, which claims the benefit of German Patent Application No. 10 2014 109 706.8, filed Jul. 10, 2014; which are both incorporated herein by reference in their entirety.

BACKGROUND

The invention lies in the field of additive manufacturing, in particular the manufacturing of prototypes of ceramic green bodies and relates to the production of a highly dense powder bed and its use for the manufacturing of a solid.

In additive manufacturing methods which are based on the layer-by-layer structure of the starting material as powder, the layer application is an essential process step. As a result of the repeated application of powder layers and the writing of the layer information into the respective layer, a component which is animated in the computer and decomposed into virtual layers is constructed layer by layer from successive powder layers. The complete powder structure constructed by repeated application of layers which includes the component is called powder bed.

The loose powder bulk materials of ceramic particles, metallic and polymer powders which are constructed layer by layer in corresponding powder-based additive manufacturing processes typically have only a low density which on average corresponds to the bulk density of the particles. This makes it difficult to generate a compact component in the additive manufacturing process itself or during a subsequent sintering process. In the case of ceramic powders it is even impossible to obtain a compact component starting from loose bulk materials. Furthermore, the low density of the powder bed brings about a low strength of the powder bed. Therefore a support structure for the component must usually be constructed synchronously with the actual component. The task of the support structure is the fixing of the component with respect to the building platform and therefore in the coordinate system of the installation. The construction of this support structure is time-consuming. Likewise the subsequent removal of the support structure from the actual component after completion of the construction process is time-consuming and typically cannot be automated.

SUMMARY

Against this background, a method for producing a layer by: a) providing a particle layer depositing arrangement comprising a first and a second half-space, where a dividing wall separates the first half-space from the second half-space and the dividing wall is permeable for a dispersion medium and impermeable for particles dispersed in the dispersion medium; b) providing a particle dispersion comprising the dispersion medium and particles dispersed therein in the first half-space, wherein the particle dispersion is distributed substantially homogeneously in the first half-space: c) producing a pressure gradient between the first and the second half-space so that the pressure gradient in the first half-space brings about a flow of the particle dispersion directed towards the dividing wall, d) depositing a particle heap comprising geometrically densely packed particles on the dividing wall by transport of dispersion medium into the second half-space. The use of this method comprising: g) stacking various layers of geometrically dense-packed particles having uniform layer thickness; gg) locally limited linking of neighbouring panicles of one layer over the entire thickness of this one layer, and ggg)

at least partial fastening of immediately neighbouring layers of a layer stack to one another, wherein the at least partial fastening is accomplished in regions of locally limitedly linked neighbouring particles of the neighbouring layers. An additive manufacturing method for producing a solid comprising: i) providing a first layer of geometrically dense-packed particles having uniform layer thickness, ii) producing a layer stack by stacking a second layer of geometrically dense-packed particles on a surface of the first layer to produce a layer stack; or producing a layer stack by producing a second layer of geometrically dense-packed particles on a surface of the first layer using a fluidized bed as particle source and an air or gas flow through the dividing wall and the already deposited layer located on this dividing wall: iii) locally limited fixing of neighbouring particles, which extends over the total layer thickness of the second layer and covers the surface of the first layer, wherein the locally limited fixing comprises: a local application of a fixing agent or a local exposure with respect to an electromagnetic radiation or a local heating with a laser beam. In some embodiments, the method further comprising: iv) regulating a volume flow of the dispersion medium so that a volume of the dispersion medium which flows through the dividing wall within a unit time is constant at least during the production of the layer stack according to step ii). In some embodiments the layer thicknesses of at least two of the stacked particle layers differ from one another. In some embodiments, the stacking is accomplished by means of: h) repeating steps b), c), d) and e) listed above, wherein after the smoothing according to step e) and before a repeated deposition according to step d), a further step hh) is carried out: hh) locally limited fixing of the smoothed layer of dense-packed particles having uniform layer thickness, wherein the locally limited fixing is accomplished by a local application of a fixing agent, by a local exposure to an electromagnetic radiation, in particular by a laser-induced local heating. In some embodiments, the local limited fixing is accomplished exclusively on sections of the particle layer which correspond to a contour of the layer-by-layer constructed solid or which are directly adjacent to a contour and/or a surface section of the layer-by-layer constructed solid. In some embodiments, the solid is a green body and the particles are a ceramic powder. In some embodiments, the ceramic powder comprises powders having an average particle diameter of 50 nm to 500 µm, in particular particles having average particle diameters between 200 nm and 250 µm, preferably between 1 µm and 100 µm. In some embodiments, the method further comprises: releasing the ceramic green body by means of removing a non-fixed fraction of the stacked layers. In some embodiments, the release takes place automatically with the aid of an applied fluid, directed with a fluid pressure. In some embodiments, the release further comprises an action of acoustic and/or mechanical vibrations on the layer stack. The disclosure also relates to and the use of such methods to produce a ceramic green body.

Further embodiments, modifications and improvements are obtained by reference to the following description and the appended claims.

DETAILED DESCRIPTION

According to a first embodiment, an additive manufacturing method for producing a layer of geometrically dense-packed particles is proposed. The additive method comprises the steps:
a) Providing a particle layer deposition arrangement. The particle layer deposition arrangement has a first and a second half-space. Both have a wall in common which as a dividing wall separates the first half-space from the second half-space. The dividing wall is permeable for a dispersion medium and impermeable for particles dispersed in the dispersion medium;
b) Providing a particle dispersion in the first half-space wherein the particle dispersion comprises the dispersion medium and particles dispersed therein. The particle dispersion is distributed substantially homogeneously in the first half-space, in particular it is distributed homogeneously over the first half-space;
c) Producing a pressure gradient between the first and the second half-space so that the pressure gradient in the first half-space causes a flow of the particle dispersion directed towards the dividing wall. In particular the flow always brings new particles towards the dividing wall;
d) Depositing a particle heap comprising geometrically dense-packed particles on the dividing wall by transport of dispersion medium into the second half-space. As a result of the filter action of the dividing wall and the continuous removal of particle-free dispersion medium through the dividing wall, the particles are deposited before the dividing wall.

Advantages of this embodiment are obtained from a maximum packing density of the particle layer produced on the dividing wall which can be achieved for the given particle size and particle size distribution. For example, for a geometrically dense packing of spheres of the same sphere diameter, a maximum packing density (spatial filling) is 74% assuming that only complete particles are involved in forming the layer. The actual density is then obtained from the average density of the particles.

According to a further embodiment, the proposed additive manufacturing method further comprises the step e): smoothing the particle heap by means of scraping and/or grinding so that the particles of the particle heap are removed until the layer of geometrically dense-packed particles on the dividing wall has a uniform layer thickness.

Advantageously a constant layer thickness over the entire extension of the layer can thus be achieved.

According to a further development, a further step cc) is inserted between steps c) and d). This step cc) comprises providing a fluidized bed of dispersed particles in the first half-space. In this case, the fluidized bed is in contact with the dividing wall at least partially. In addition, the particle dispersion of the fluidized bed has a higher density than in a section of the particle dispersion in the first half-space located outside the fluidized bed.

Advantages of this embodiment comprise the advantages of fluidized beds in general. The particles in the fluidized bed are mechanically activated, any unevennesses of a surface over which the fluidized bed is poured are rapidly compensated. As a result of this, the fluidized bed is an ideal source for the replenishment of particles from the particle dispersion to the dividing surface i.e. to particles which have already accumulated there or which are fixed under the influence of the pressure gradient.

According to a further embodiment, the particle heap merely comprises two phases and comprises a particle phase and a fluid phase.

In particular the presence of only one fluid phase distinguishes the ordered particle heap in the form of the layer of geometrically dense-packed particles from known particle layerings. For example, a substantially dry particle dispersion present only in a gaseous dispersion medium can form the layer of geometrically densely-packed particles. A layer of geometrically dense-packed particles which was produced with the aid of a liquid, for example, water and a gas, for example air, has water and air adjacent to one another in its pore space. In this case, the water is present not only as a layer of adsorptively bound water molecules: a layer of adsorptively bound water covers almost all surfaces under normal conditions of a non-apparatus-controlled climate at sea level. In contrast to this adsorptively bound water, for example when producing a particle heap from an aqueous suspension (slurry), the water is present as a regularly liquid phase, for example, in particle intermediate spaces. For example, the layer of geometrically dense-packed particles produced according to the method differs from a simple filter cake such as accumulates during mechanical filtration on a filter by the lack of this water phase. This is particularly important when the layer of geometrically dense-packed particles produced is to be thermally consolidated, for example. If liquid water is present in the layer, the layer would be loosened by escaping water vapour and lose its high packing density before the intended consolidation.

According to a further embodiment, the proposed additive manufacturing method further comprises a step designated as step f): placing the layer of geometrically dense-packed particles having uniform layer thickness outside the particle layer deposition arrangement.

Advantages of this embodiment are obtained from the time-delayed use of the layers produced. As a result of several runs, comprising steps a) to f), a plurality of different layers having uniform layer thickness comprising geometrically dense-packed particles can thus be provided. The layers can differ with regard to their layer thicknesses, but also with regard to the material character or the fine structure of the particles forming the layers. Layers of different thickness can therefore be stacked one upon the other. Likewise, layers can be stacked laterally offset to one another. This affords extended possibilities for manufacturing three-dimensional objects.

According to a further embodiment, the provision of the particle dispersion is accomplished by producing the dispersion directly in the first half-space. For example, a flow of the dispersion medium into a particle storage container in the first half-space is introduced in order to produce the particle dispersion. To this end, a directed jet of the dispersion medium can be introduced into the storage container filled with particles. Likewise, one or more baffle surfaces can be used in order to achieve a homogeneous distribution of the particle dispersion in the first half-space.

Advantages of this embodiment are obtained from the complete reusability of the particles provided. After a process run, remaining particles can be collected again without losses and optionally formed into layers of uniform, i.e. substantially constant, thickness in another method on a different type of dividing wall.

According to a further development of this embodiment, the production of the dispersion in the first half-space comprises the introduction of a gas or a gas mixture into the first half-space.

Advantages of this embodiment are obtained from the flexibility of the dispersion method. The alignment, flow intensity (flux), flow profile etc. of the introduced gas flow can comprise a gas, various gases, or one or more gas mixtures. For example, the parameters of the introduction can be adapted to a density of the particle material.

According to a further embodiment it is proposed to perform the smoothing with the aid of a spreading unit where the spreading unit comprises a rotating roller, a rotating brush, a blade and/or a slider. The rotating roller, the rotating brush, the blade and/or the slider are guided over the heap with the aid of the spreading unit so that the uniform layer thickness is achieved. In particular, the spreading unit can be guided at a fixedly adjustable distance from the dividing wall at a constant speed of advance over the heap on the dividing wall. A uniform layer thickness which can be adjusted here lies in a range from 500 nm to 5 mm, in particular between 1 µm and 500 µm, preferably between 30 µm and 200 µm.

Advantages of this embodiment consist, for example, in the possibility of being able to adapt the spreading unit to the type of particle and particle size.

According to a further embodiment, the blade and/or the slider are/is connected rotatingly or rigidly to the spreading unit.

Advantages of this embodiment are obtained from the possibility of the gentle removal of existing unevennesses without the particle packing present under a removed portion of the layer becoming loosened.

According to a further embodiment, the use of a layer of geometrically dense-packed particles having uniform layer thickness in an additive manufacturing method is proposed. This additive manufacturing method comprises the steps: g) stacking various layers of geometrically dense-packed particles having uniform layer thickness; gg) locally limited linking of neighbouring particles of one layer over the entire thickness of this one layer; and ggg) at least partial fastening of immediately neighbouring layers of a layer stack to one another. In this case, the at least partial fastening is accomplished in regions of locally limitedly linked neighbouring particles of the neighbouring layers.

Advantages of this embodiment comprise the stacking of layers which differ at least with regard to one parameter: layer thickness, size of the particles, chemical composition of the particles, in particular the presence of functional groups on the surface of the particles.

According to a further development of the additive manufacturing method for producing a solid from layers of respectively uniform layer thickness comprising geometrically dense-packed particles, the manufacturing method comprises the steps:
i) providing a first layer of geometrically dense-packed particles having uniform layer thickness;
ii) producing a layer stack by stacking a second layer of geometrically dense-packed particles on a surface of the first layer to produce a layer stack; or producing a layer stack by producing a second layer of geometrically dense-packed particles on a surface of the first layer using a fluidized bed as particle source and an air or gas flow through the dividing wall and the already deposited layer located on this dividing wall;
iii) locally limited fixing of neighbouring particles, which extends over the total layer thickness of the second layer and covers the surface of the first layer, wherein the locally limited fixing comprises:
a local application of a fixing agent or
a local exposure with respect to an electromagnetic radiation or
a local heating with a laser beam.

Advantages of this embodiment comprise the possibility of serially arranging a plurality of layers on one another one above the other whereby the layer produced previously on the dividing wall serves as an support for the subsequently additively deposited particle layer. In particular, this can be accomplished by a step-wise (taking place with each completed layer deposition process) lowering of the dividing wall.

According to a further development of this embodiment, here designated as step iv), the flux, i.e. the volume flow of the dispersion medium through the dividing wall is kept constant at least during the additive construction of a layer sequence or the production of the high-density powder bed. This means that a volume of the dispersion medium which flows within a unit time from the first half-space through the dividing wall into the second half-space is substantially constant at least during the production of the layer stack according to step ii) within the limits of accuracy of the equipment used in the process technology (comprising, e.g. flow meter and/or flux meter and/or pressure sensor and/or pump etc.). This can be achieved in particular by the specific regulation of the pressure in the first half-space and/or in the second half-space. For example, at least one pressure sensor can be disposed in the second half-space, i.e. that space kept substantially free of particles by the dividing wall. Alternatively or additionally a flow meter can be suitably arranged. Likewise, a flow measurement can be made on, in or behind the dividing wall in the second half-space, for example, by means of laser or ultrasound Doppler methods.

Advantages of this embodiment are obtained from a homogeneous packing density of the high-density powder bed, or over the height of the layer stack located on the dividing wall and growing with each additional applied layer. Similarly to this, the mean pore volume in the solid produced is substantially identical. This is advantageous for the use of the solid as a prototype. Prototypes are frequently used not only to visualize an external appearance but also for process optimization or are used for determining function-determining parameters. Against this background, inhomogeneities in the solid are undesirable.

According to a further embodiment it is proposed that the layer thicknesses of at least two of the stacked particle layers differ.

Advantages of this embodiment consist in the large multiplicity of three-dimensional bodies which can be obtained.

According to a further embodiment, the stacking is accomplished by means of: h) repeating steps b), c), d) and e) according to claim 1, wherein after the smoothing according to step e) and before a repeated deposition according to step d), a further step hh) is carried out. This step hh) comprises a locally limited fixing of the smoothed layer of dense-packed particles having uniform layer thickness. In this case, the locally limited fixing is accomplished by a local application of a fixing agent. Alternatively a local exposure to an electromagnetic radiation, in particular to laser radiation, can also be accomplished. Typically the laser radiation effects a local heating of the particle layer.

Advantages of this embodiment consist in the multiplicity of possible compaction principles: by sintering, by sectional fusing, by adhesion, by polymerizing, by forming covalent or non-covalent chemical bonds.

According to a further embodiment, the locally limited fixing is accomplished exclusively on sections of the particle layer which correspond to a contour of the layer-by-layer constructed solid or which are directly adjacent to a contour and/or a surface section of the layer-by-layer constructed solid.

Advantages of this embodiment are obtained from the acceleration of the work steps.

According to a further embodiment, it is proposed that in the method for additive manufacturing of a solid in question here, the solid is a green body and the particles are a ceramic powder.

Advantages of this embodiment are obtained from the major practical importance of ceramic green bodies and the efficient manufacturing thereof.

According to a further development, the ceramic powder comprises powders having an average particle diameter of 50 nm to 500 μm, in particular particles having average particle diameters between 200 nm and 250 μm, preferably between 1 μm and 100 μm.

According to a further embodiment, the additive method further comprises releasing the ceramic green body by means of removing non-fixed particles or non-fixed fractions of the stacked layers. For example, loosely adhering particles on compacted or fixed fractions in the powder bed are removed until the actual green body is present and the removed loosely adhering particles are collected and can be supplied again to a layer deposition process.

Advantages of this embodiment are obtained from the recovery of the non-fixed fractions. Largely closed manufacturing cycles can be achieved where starting materials (particles) are guided in a closed cycle.

According to a further embodiment, the release takes place automatically with the aid of an applied fluid, directed at a fluid pressure.

Advantages of this embodiment are obtained from the fact that the fluid used as dispersion medium can also be used for release.

According to a further embodiment, the release comprises an action or a coupling-in of acoustic and/or mechanical vibrations onto or into the layer stack.

Advantages of this embodiment are again obtained from the possibility for automation. Said vibrations can be coupled-in without contact so that there is no risk of contaminating or mechanically damaging the surface of the green body.

Use of an additive manufacturing method according to one of the previously described methods to generate a ceramic green body.

The advantages of this embodiment primarily come into their own in the automated prototype manufacturing/rapid prototyping and serial manufacturing for batch sizes <1000: low material costs due to effective use of high-quality and exactly classified particle fractions. The use of very small particles to construct particle layers by means of conventional methods is limited by the inadequate pourability and the growing influence of surface charges on the pouring behaviour. Typically ceramic particles below 30 μm are not sufficiently pourable for an efficient layer structure if they are applied by means of conventional application techniques.

The embodiments described can be arbitrarily combined with one another.

In powder-based additive manufacturing methods, the layer application is accomplished by coating a powder reservoir by means of a flat spreading unit. This spreading unit can comprise a rotating roller or a blade or a vibrating blade or similar. The actual process of application of the layer is accomplished whereby the spreading unit has a fixed distance from the surface of the powder bed. This distance is uniform over the entire layer.

During application the powder can thus pour between the layer unit and the powder bed and there form the respective layer. The pouring is substantially gravity-driven. That is, the individual powder particles follow gravity. This has the result that depending on the orientation of the plane in which the spreading unit moves, an orientation of the powder bed surface is accomplished with the surface normal of the powder bed surface in the direction of the gravitational force and an angle between the surface normal of the powder bed surface and the vector of the gravitational force is 0° (if horizontal layers are produced) or encloses an angle of less than 90° (if the layer application is accomplished in an inclined plane). Typically this angle is less than 60° since otherwise the stability of the powder bed would not be ensured. The coating of the powder bed with a constant distance of the spreading unit from the powder bed surface ultimately defines the thickness of the applied powder layer.

The method described for application of powder layers is only possible with the aid of the gravitational force or a comparable force (e.g. centrifugal force). The powder particles are always in direct contact with other powder particles, the powder reservoir. This results in a restricted mobility of the individual powder particles. This in turn hinders an optimal accumulation of powder particles to form a closest packing on the surface of the powder bed. In suspension-based layer application methods a significantly higher packing density (>60%) is achieved. Such layer application methods are usual, for example, in the processing of ceramic particles in so-called slip casting. The liquid phase in this case acts almost as a lubricant between the individual powder particles and promotes the formation of a dense packing.

One class of the early methods for additive manufacturing is formed by the powder-based methods in which powder layers having a typical thickness of 50 to 200 μm are stacked. In each of these layers the powder particles are linked to one another and to the layer located underneath in each case by a locally applied binder or by means of local fusion with the aid of a laser beam.

Binder-based powder methods were developed at Massachusetts Institute of Technology in Cambridge, USA, at the beginning of the nineties, laser-based methods were developed at the University of Texas in Austin, USA at the end of the eighties of the last century. They are designated as 3D printing [1] or selective laser sintering [2]. Both methods have now found a fixed place among the now numerous additive manufacturing methods and certainly belong to the leading methods with regard to the number of fabricated components.

In addition to a continuous optimization of the technologies forming the basis of these two methods, in the thirty years since their invention no significant further development has taken place in 3D printing or in selective laser sintering.

There are numerous methods in which a powdery material is used as starting material. The three most commonly used methods are mentioned as an example:

Selective laser sintering (SLS) was originally developed for powder from nylon polycarbonate and waxes and subsequently applied to metal powder. In a reactor powder layers are locally sintered onto a powder bed, where the sintering temperature is achieved by using lasers [2].

Selective laser melting (SLM) is a further development of selective laser sintering (SLS) and is used for powders which can be almost completely compacted by the formation of a melting phase, where the melting temperature is reached by using lasers.

Three-dimensional printing [1] uses polymer powders, metallic or ceramic powder for application of layers which are then solidified by means of local injection of a binder. Technologies comparable to ink jet printing are used for injection of the binder.

All powder-based methods have the following common features:
1. The shaping is achieved not by removal of material but by addition of material. A local solidification of a powdery starting material takes place.
2. All the methods construct partial geometries comprising layers of finite thickness where all the layers are achieved by a so-called slice process which is based directly on CAD data.
3. The layer application is gravity-driven by means of a pourable powder which is formed into a layer by sliding a spreading unit over the powder bed.

The actual process of application of the layer is accomplished whereby a spreading unit has a fixed distance from the surface of the powder bed which is uniform over the entire layer and the powder pours between spreading unit and powder bed. Either the powder required for the layer structure is delivered continuously by a metering unit when coating the powder bed or a powder heap functions as a powder reservoir.

The pouring of the powder into the intermediate space between spreading unit and powder bed is gravity-driven, i.e. the individual powder particles follow gravity. This automatically brings about an orientation of the powder bed surface with the surface normal of the powder bed surface in the direction of the gravitational force. An angle between the surface normal of the powder bed surface and the gravitational force is therefore 0° or encloses an angle of less than 90° preferably less than 60°. The coating of the powder bed with a constant distance of the spreading unit from the powder bed surface ultimately defines the thickness of the applied powder layer.

According to the present prior art, only pourable powders can be applied to form layers having sufficient quality. This means that a certain minimum particle size of the powder must not be fallen below. In the case of powders having too fine particles, the adhesive forces between the particles are comparably as great as those forces which act on the particles due to gravity. Typically ceramic particles of less than 30 µm are not sufficiently pourable for an efficient layer structure. This counteracts a uniform pouring and therefore a uniform layer structure. Finer powders however afford numerous advantages, e.g. the possibility of applying thinner layers. This results in a higher construction accuracy and a better subsequent compaction of components by sintering since smaller particles are more sinterable. The suction of fluidized particles through the powder bed now allows the use of finer particles for the construction of powder layers during additive manufacturing. Particles having a mean particle diameter of less than 30 µm, in particular particles having a mean particle diameter between 200 nm and 30 µm, preferably between 1 µm and 10 µm can thus be processed without any problems.

Starting from this, it is one aim to increase the density of the powder bed which is constructed by layer-by-layer application of loose powder in the powder-based manufacturing process and which encloses the component to be constructed. One technical object therefore consists in producing a compact powder bulk material (powder bed) during application of layers of a loose powder in the additive manufacturing process with loose powders.

Preferably according to all the embodiments described here, densest particle packings are achieved which have a reduced pore volume compared with known loose dry powder bulk material. In particular, an achieved porosity of the particle heap achieved—optionally by means of negative pressure or by means of positive pressure—is less than 45%. For example, a fraction of the pore volume of the total volume of the particle heap produced is a maximum of 43%. Accordingly, the density of the particle heap produced is at least 55% of the theoretical density of the ceramic powder mixture used, or 57%. Here theoretical density is understood as that density of a non-porous solid which is exhibited by the material composition of the ceramic powder material which forms the heap at the dividing wall between first and second half-space. The porosity is determined gravimetrically with a precision of ±2% or pycnometrically with a precision of less than or equal to ±0.1%. Advantageously 55% theoretical density or even 45% porosity is sufficient for a sinterable ceramic green body. Thus, the method described for producing a layer of a dry ceramic powder combined with a step comprising locally limited fixing of neighbouring particles is suitable for producing a densely sinterable green body. For rigid, largely uniformly spherical particles there are numerous possibilities for a packing in the powder bed. Compared to the idealized densest packing of spheres, that packing which has a minimum pore space (<40 volume percent) or the highest attainable density (~74% of the theoretical density) is considered to be the densest packing.

A high density of the powder in the powder bed results in an improved fusion or sintering behaviour during the compaction of the powder to form a compact component directly during the additive manufacturing process or in a subsequent sintering process.

By producing a gas flow directed in the direction of a flat filter, individual particles can be sucked onto the filter. The flat filter is covered with a particle layer in this case. For this purpose powder particles must be continuously supplied in the gas flow which can be achieved, for example, by the fluidization or atomization of powders by a second gas flow through a powder reservoir. Such an activated powder is also designated as fluidized bed. After a layer having a certain thickness has been deposited on the filter, no further particles are supplied to the filter unit. The layer formed on the filter will possibly not have a uniform layer thickness. A uniform layer thickness is achieved in this case by an additional step of powder removal by means of a mechanical scraping or grinding.

A spreading unit which comprises substantially rigid or vibrating blades or rotating rollers is used for this purpose.

When the layer is constructed, the layer information is transferred into the layer as in the commonly used additive manufacturing methods by means of injection of a binder (3D printing) or by local laser sintering (selective sintering) etc. The process step of powder application is then repeated where the powder layers already produced now also function as filter. This process is repeated until all the layers of the component to be constructed have been processed.

The packing density of the layer produced which is achieved with this method is comparable to the packing density of the layers in ceramic slip casting. The porosity of the layer produced is therefore less than 40%.

By producing a gas flow through a flat filter which for example can be the powder bed itself, individual powder particles can be sucked onto the filter. Since the powder particles do not interfere with each other during the aspiration process until they have reached the porous substrate through which the gas flow is conducted, the particles can be arranged largely freely and unhindered to form a densest packing.

Preferred places for a newly extracted particle on an already existing particle layer are points at which a plurality of particles are in contact. At these points the gas flow due to the open porosity of the already extracted powder is the strongest. Advantageously these are precisely those points at which a new particle layer is to be accumulated in the sense of a densest packing of spheres. Consequently the gas flow guides the individual particles to accumulation points on the surface of a powder bed which correspond to a densest packing of spheres in the case of almost spherical particles of the same size.

This is only possible as long as the particles to be accumulated do not interfere with each other. For this reason the powder is supplied to the filter in dispersed form. In the case of a dry powder and air as dispersion medium, an air flow prevents the powder particles from coming too close and interfering in their movement, this process is also called air-activated powder. Furthermore, powder particles are supplied continuously in the gas flow which is achieved, for example, by the fluidization or atomization of powders by a second gas flow which runs through a powder reservoir. Such an activated powder is also designated as fluidized bed.

Previous processes for the layer application of loose powders in additive manufacturing processes do not take into account the fact that the individual powder particles require time and a certain free space to accumulate to form a densest packing. In all known methods for the layer application of loose powder layers in additive manufacturing, powder bulk material impedes this free movement of powder particles. The purely gravitational forces during layer application of pourable powders are not sufficient to guide the particles to the optimal positions for a densest packing of spheres. The combination of a second air flow guided through the powder bed, the powder thus fluidized or powder dust as powder source with the first air flow guided through the filter and used for layer construction make this possible. The use of air flows to produce a (powder) fluidized bed as powder source is described as an example hereinbefore. However the person skilled in the art is aware that other gases or gas mixtures can also be used as air for producing the powder fluidized bed. Likewise, fluids other than air, gases or gas mixtures, for example, liquids can also be used as dispersion media to produce the powder fluidized bed (powder source).

According to previously known methods, no extraction of particles from a particle dust or another type of fluidized powder with the aid of an air flow through the powder bed is used to apply powder layers in powder-based additive manufacturing methods. The previously described new method allows a higher packing density of the particles in the applied powder layer.

Furthermore, there is no longer the problem that very fine particles in the dry state have a low flowability and therefore are no longer suitable for layer application below a certain mean particle diameter. However, fine particles specifically afford the advantage of a high surface quality, i.e. a low roughness of the prototypes produced, the advantage of an improved sinterability of the green bodies produced or advantages when adjusting specific particularly fine-crystalline structures, e.g. for a ceramic component.

An increased density of the powder bed results in a firmer powder bed whereby the support function of the powder bed is increased. Advantageously the respectively desired bodies can thus be formed in the powder bed without additional support structures.

Furthermore, layer application is possible in almost any arbitrary orientation of the layer since the forces which act on the powder particles through the gas flow exceed the gravitational force.

In summary, an additive manufacturing method is proposed comprising the production of at least one layer of geometrically densely packed particles, which is used to produce a shaped body and which comprises the following steps:

a) providing a particle layer deposition arrangement comprising a first and a second half-space, where a dividing wall separates the first half-space from the second half-space and the dividing wall is permeable for a dispersion medium and impermeable for particles dispersed in the dispersion medium;

b) providing a particle dispersion comprising the dispersion medium and particles dispersed therein in the first half-space, wherein the particle dispersion is distributed substantially homogeneously in the first half-space;

c) producing a pressure gradient between the first and the second half-space so that the pressure gradient in the first half-space brings about a flow of the particle dispersion directed towards the dividing wall;

d) depositing a particle heap comprising geometrically densely packed particles on the dividing wall by transport of dispersion medium into the second half-space.

Preferably the particles are homogeneously distributed in the form of a fluidized bed formed in the first half-space and are arranged from the fluidized bed on the dividing wall in geometrically dense packing. In this way, additional layers can be additively constructed on the layer thus produced. This is accomplished, for example, by moving the dividing wall in the direction of the second half-space. Alternatively additional layers thus produced or produced differently can be stacked on the additively produced layer on a side of the dividing wall facing the first half-space. The densely packed particles of the layers arranged one above the other in the form of a layer stack are each fixed locally, i.e. in discrete sections of the respective layer. These discrete sections typically correspond to a contour, an inner or an outer surface of a shaped body present after completion of the process embedded in the compacted powder bed. During fixing the fixed particles of the upper layer are bound to the fixed particles of the layer located thereunder. The shaped body can be released by re-suspension or re-dispersion of non-fixed fractions of particles.

Although specific embodiments have been presented and described herein, it lies within the framework of the present invention to suitably modify the embodiments shown without departing from the scope of protection of the present invention. The following claims form a first non-binding attempt to generally define the invention.

REFERENCES

[1] Sachs E. M., Haggerty J. S., Cima M. J., Williams P. A., Inventors; Massachusetts Institute of Technology, Assignee. Three-dimensional printing techniques. U.S. Pat. No. 5,204,055; 1993 Apr. 20;

[2] Deckard C. R., Inventor; Board of Regents, The University of Texas System, Assignee. Method and apparatus for producing parts by selective sintering. U.S. Pat. No. 4,863,538; 1989 Sep. 5

What is claimed is:

1. A method for producing a layer of geometrically densely packed particles for use in an additive manufacturing method, the method comprising:

a) providing a particle layer depositing arrangement comprising a first and a second half-space, where a dividing wall separates the first half-space from the second half-space and the dividing wall is permeable for a dispersion medium and impermeable for particles dispersed in the dispersion medium;

b) providing a particle dispersion comprising the dispersion medium and particles dispersed therein in the first half-space, wherein the particle dispersion is distributed substantially homogeneously in the first half-space;

c) producing a pressure gradient between the first and the second half-space so that the pressure gradient in the first half-space brings about a flow of the particle dispersion directed towards the dividing wall;

d) depositing a particle heap comprising geometrically densely packed particles on the dividing wall by transport of dispersion medium into the second half-space, wherein providing the particle dispersion is accomplished by producing the particle dispersion directly in the first half-space.

2. The method according to claim 1, further comprising:
e) smoothing the particle heap by means of scraping and/or grinding so that the particles of the particle heap are removed until the layer of geometrically densely packed particles on the dividing wall has a uniform layer thickness.

3. The method according to claim 1, wherein a step is further inserted between step c) and step d):
cc) providing a fluidized bed of dispersed particles in the first half-space, wherein the fluidized bed is in contact with the dividing wall at least in sections and a density of the dispersion of dispersed particles in the fluidized bed is higher than in a remaining volume of the first half-space.

4. The method according to claim 1, wherein
the particle heap merely comprises two phases, comprising a particle phase and a fluid phase.

5. The method according to claim 1, further comprising:
f) placing the layer of geometrically densely packed particles having uniform layer thickness outside the particle layer deposition arrangement.

6. The method according to claim 5, wherein providing the particle dispersion comprises introducing a gas or a gas mixture.

7. The method according to claim 1, wherein smoothing is accomplished with the aid of a spreading unit and the spreading unit comprises a rotating roller, a rotating brush, a blade and/or a slider,
wherein the rotating roller, the rotating brush, the blade and/or the slider is guided over the heap with the aid of the spreading unit so that the uniform layer thickness is achieved,
wherein the uniform layer thickness can be adjusted in a range from 500 nm to 5 mm.

8. The method according to claim 7, wherein the blade and/or the slider are/is connected rotatingly or rigidly to the spreading unit.

9. The method of claim 7, wherein the uniform layer thickness can be adjusted in a range between 1 µm and 500 µm.

10. The method of claim 7, wherein the uniform layer thickness can be adjusted in a range between 30 µm and 200 µm.

* * * * *